(12) United States Patent
Nakano et al.

(10) Patent No.: US 6,900,875 B2
(45) Date of Patent: May 31, 2005

(54) METHOD OF MANUFACTURING LIQUID CRYSTAL DISPLAY AND DRYING APPARATUS

(75) Inventors: Keiko Nakano, Yokohama (JP); Hirotaka Imayama, Mobara (JP); Shigeki Matsuda, Mobara (JP); Toshirou Iwata, Mobara (JP); Masahiro Yamada, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/222,847

(22) Filed: Aug. 19, 2002

(65) Prior Publication Data

US 2003/0112407 A1 Jun. 19, 2003

(30) Foreign Application Priority Data

Nov. 30, 2001 (JP) ........................................ 2001-367097

(51) Int. Cl.⁷ ................................................. G02F 1/13
(52) U.S. Cl. ........................................................ 349/187
(58) Field of Search ........................ 349/187, 123–125, 349/191, 153, 161, 158

(56) References Cited

U.S. PATENT DOCUMENTS

| | | | | |
|---|---|---|---|---|
| 4,390,244 A | * | 6/1983 | Hareng et al. ................. 349/21 |
| 5,625,475 A | * | 4/1997 | Tanioka et al. ............. 349/123 |
| 5,976,256 A | * | 11/1999 | Kawano ..................... 118/684 |
| 6,061,114 A | * | 5/2000 | Callegari et al. ........... 349/125 |
| 6,106,907 A | * | 8/2000 | Yoshikawa et al. .......... 428/1.1 |
| 6,184,954 B1 | * | 2/2001 | Inoue et al. .................. 349/86 |
| 6,226,067 B1 | * | 5/2001 | Nishiguchi et al. ......... 349/155 |
| 6,392,736 B1 | * | 5/2002 | Furukawa et al. .......... 349/158 |
| 6,420,834 B2 | * | 7/2002 | Yamazaki et al. ....... 315/169.3 |
| 6,441,880 B1 | * | 8/2002 | Utsumi et al. .............. 349/155 |
| 6,577,356 B2 | * | 6/2003 | Onishi et al. ................. 349/32 |
| 6,618,112 B1 | * | 9/2003 | Yoshimura et al. ......... 349/155 |
| 2002/0081503 A1 | * | 6/2002 | Kawase et al. ................. 430/7 |

FOREIGN PATENT DOCUMENTS

| | | |
|---|---|---|
| JP | 10-039303 | 2/1998 |
| JP | 2000-002809 | 1/2000 |

* cited by examiner

Primary Examiner—Karl D. Frech
Assistant Examiner—Edwyn Labaze
(74) Attorney, Agent, or Firm—Antonelli, Terry, Stout & Kraus, LLP (57) ABSTRACT

In a process for forming an alignment film on a substrate that is used for a liquid crystal display, a coating destined to be the alignment film is formed on one surface of the substrate, and a gas flow is formed by a nozzle on a surface side on which the coating is formed. By thus implementing, an uniform alignment film can be formed on the substrate for use in the liquid crystal display.

14 Claims, 8 Drawing Sheets

| SUPPORTER MATERIAL | THERMAL DIFFUSIVITY (mm²/s) |
|---|---|
| ALUMINUM | 29.8 |
| SODA GLASS | 0.47 |
| TEFLON® | 0.12 |
| BESPEL® | 0.1 |

| COMPARISON ITEM | HOT AIR | HOT PLATE |
|---|---|---|
| ELECTROSTATIC CHARGE DUE TO GLASS DETACHMENT | NONE | YES |
| SUBSTRATE CRACK | NONE | YES |
| PROCESS TIME (720 × 930 mm SUBSTRATE) | LESS THAN 60 SECONDS | MORE THAN 100 SECONDS |
| IN-PLANE TEMPERATURE UNIFORMITY | ± 1 DEGREE CENTIGRADE | ± 2 DEGREE CENTIGRADE |

METHOD OF MANUFACTURING LIQUID CRYSTAL DISPLAY AND DRYING APPARATUS

BACKGROUND OF THE INVENTION

1. Field of the Invention

The present invention relates to the manufacturing technology of a liquid crystal display, in particular to a process for drying an alignment film material that is coated on a substrate.

2. Description of the Related Art

An alignment film is formed on a substrate of a liquid crystal display so as to make a molecular arrangement state of liquid crystal uniform. A process for forming the alignment film includes (1) printing process of an alignment film material that is diluted with a solvent on one surface of a substrate, and (2) heating process for curing the alignment film formed in the printing process.

Figure 13:
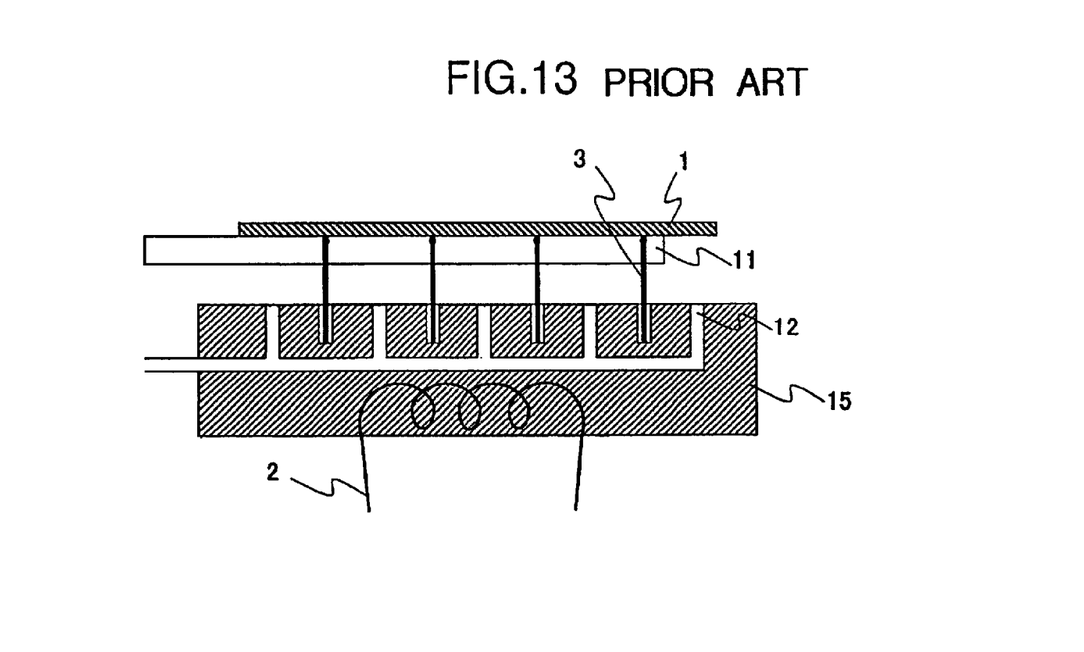
FIG. 13 is a schematic block diagram of an existing hot plate.

The heating process includes preliminarily drying process for removing a solvent from the coating of alignment film material at a temperature of substantially 100 degree centigrade, and curing the preliminarily dried alignment film at a temperature equal to 180 degree centigrade or more. In the former process, a hot plate such as shown in FIG. 13 is employed. The hot plate includes a plate 15 with a plurality of through-holes 12 that lead to an outlet in an area (hereinafter referred to as a substrate contact area) that comes into contact with other surface (a surface opposite to the surface where the coating of alignment film material is formed) of the substrate 1, a heater 2 that is buried in the plate 15, and a vacuum pump (not shown in the drawing) connected to the outlet of the plate 15.

According to such a configuration, since owing to vacuum suction of the vacuum pump, the substrate 1 can be brought into close contact with the plate 15, heat from the heater 2 can be efficiently conducted through the plate 15 to the substrate 1. The coating formed on the substrate 1 is preliminarily dried by the heat.

Figure 14:
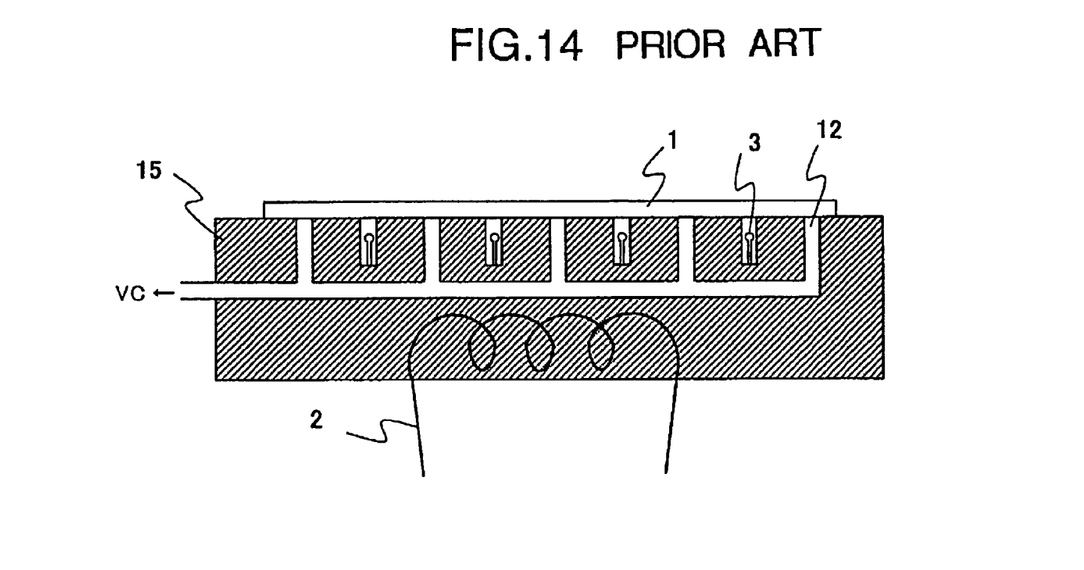
FIG. 14 is a schematic block diagram of an existing hot plate.

After the heating process, the substrate 1 in close contact with the plate 15 is necessary to be transferred from the plate 15 to a transfer arm 11. Accordingly, inside of the plate 15, a plurality of thrust pins 3 for thrusting up the substrate 1 from the substrate contact area is accommodated. As shown in FIG. 14, owing to the thrust of these thrust pins 3, the substrate 1 is detached from the plate 15. As a result, between the substrate 1 and the plate 15, a gap where an arm 11 is inserted can be secured.

SUMMARY OF THE INVENTION

Since the through holes 12 and accommodating holes of the thrust pins 3 are formed in the substrate contact area of the plate 15 of the aforementioned conventional hot plate system mentioned above, a partial area does not contact the plate 15 in a rear surface of the substrate 1. Since the partial non-contact area causes non-uniformity of surface temperature and drying speed, the variation in the film thickness of the alignment film maybe generated, and an arrangement of liquid crystal molecules in the alignment film surface may be adversely affected. As a result, the display characteristics of the liquid crystal display may be damaged.

It is an object of the present invention intends to manufacture a liquid crystal display having excellent display characteristics.

With the above object in view, in the present invention, in forming an alignment film on a substrate used for a liquid crystal display, a gas flow is generated above an alignment film coating the substrate.

By configuring thus, a liquid crystal display having excellent display characteristics can be obtained.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

In the following, with reference to accompanying drawings, one embodiment according to the present invention will be explained.

Figure 1:
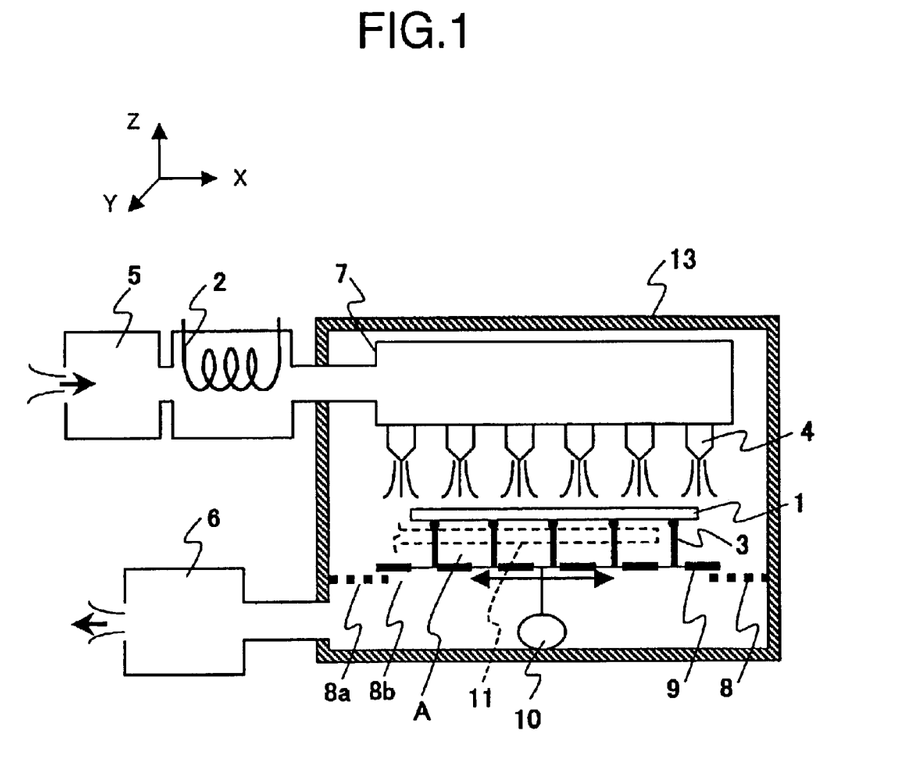
FIG. 1 is a schematic block diagram of drying apparatus according to one embodiment of the present invention.

First, with reference to FIG. 1, a configuration of drying apparatus according to the present embodiment will be explained. For convenience of the following explanation, in FIG. 1, orthogonal coordinates including an installation surface of the drying apparatus in an XY plane are defined.

The drying apparatus includes an air supply blower 5 with a hepafilter that makes clean a gas (air, nitrogen and so on) that is taken in from the outside; a heater 2 for heating the gas from the air supply blower 5; a base plate 9 that supports a substrate 1 on its upper surface; a soaking vessel 7 that temporarily accumulates the gas passed through the heater 2; a driver for reciprocating the base plate 9 in an X axis direction; a plurality of slit nozzles 4 that emits the gas in the soaking vessel 7 toward the upper surface of the base plate 9; a chamber 13 that accommodates inside it the base plate 9 and the soaking vessel 7; and an exhaust blower 6 for emitting an internal gas in the chamber 13 from an outlet disposed at a position below the base plate 9.

Each of slit nozzles 4 has a slit that faces the upper surface of the base plate 9. These slit nozzles 4 are arranged in one row in an x-axis direction with a substantially equal interval so that a long (major) axis of each slit are aligned parallel to a y-axis. The number of the slit nozzle 4 may be decided according to an area of the glass substrate 1 that is disposed on the upper surface of the base plate 9.

On the upper surface of the base plate 9, a plurality of pins 3 stand. Points of the pins contact the substrate and support it during the drying process. A clearance A between the substrate 1 and the base plate 9 have to be enough for a tip end of a transfer arm to be inserted in. Accordingly, on the upper surface of the base plate 9, three or more pins 3 are erected in other than an insertion path of the tip end of the transfer arm 11. For instance, when the tip end of the transfer arm 11 is fork-tailed, the plurality of pins may be arranged into a two-row matrix having a row distance equal to or more than a width of a leg portion of the tip end of the transfer arm 11.

Although these pins 3, as mentioned above, point-support the glass substrate 1, actually there are areas at contact interfaces with the glass substrate 1. Accordingly, when the pins 3 are heated with the gas from the slit nozzles 4 in the process of drying, the substrate 1 is partially heated by heat from the contact interfaces with each pin 3. In order to diminish a temperature irregularity of the substrate 1 due to this, it is preferable to make the contact area between the tip end of each pin 3 and the substrate 1 smaller. Accordingly, as a shape of the tip end of each of the pins 3, a spherical shape having a curvature radius equal to or less than 5 mm is adopted. Furthermore, the tip end of each of the pins 3 is more preferably formed of a material having a smaller thermal diffusivity.

Figure 2:
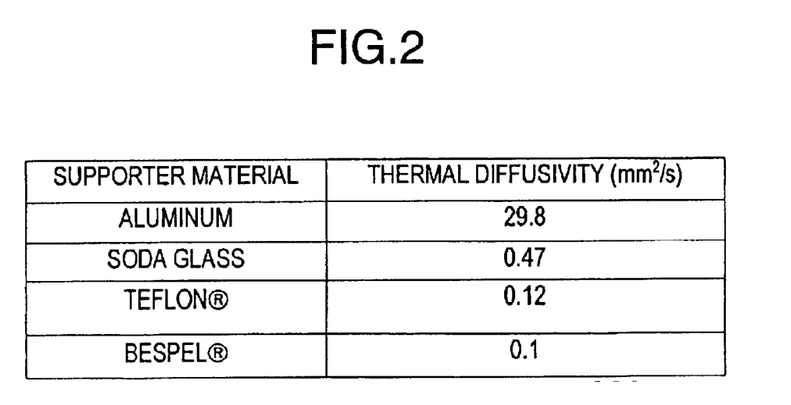
FIG. 2 is a diagram showing correspondence of supporting materials of a glass substrate and thermal diffusivities thereof.
Figure 3:
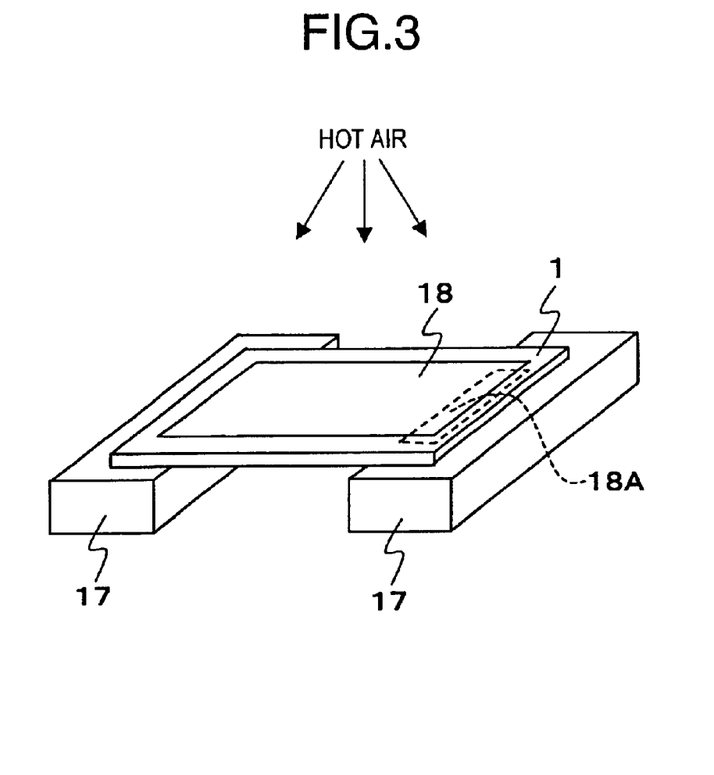
FIG. 3 is a schematic diagram of experimental facilities for studying influences that the supporting material of the glass substrate causes on a temperature distribution of the substrate.

In order to select appropriate materials as formation material of the tip end of each of the pins 3, with block materials formed of materials (aluminum, glass, Teflon (registered trade mark), and Bespel (registered trade mark)) having the thermal diffusivity in the range of 30 mm$^2$/s to 0.1 mm$^2$/s shown in FIG. 2, the following experiments were carried out. A plurality of glass substrates (100 mm×100 mm×1.1 mm) where a wet coating of alignment film material (film thickness: substantially 1.5 $\mu$m) was formed was prepared. As shown in FIG. 3, each glass substrate 1 was disposed on any one of the block materials 17 with the wet coating of alignment film material 18 directed upward.

The block material 17 made of each material partially contacts with an area 18A opposite to the formation area of the alignment film coating 18 of each glass substrate 1. In this state, when a hot air of substantially 100 degree centigrade was blown to the alignment film coating 18 of each glass substrates 1, there was detected no drying irregularity in the alignment film on the glass substrate 1 on the block material made of the material having thermal diffusivity equal to or less than 0.47 mm$^2$/s. Accordingly, in the present embodiment, at least the tip end portion of each of the pins 3 is made of the material having the thermal diffusivity equal to or less than 0.5 mm$^2$/s.

A driving unit includes a table 8 on which a guide groove 8b for guiding the base plate 9 in an x-axis direction is formed and a motor 10 for moving the base plate 9 along the guide groove 8b. The table 8 that is used here is disposed substantially level at a position below the base plate 9 so as to partition the inside of the chamber 13 into the nozzle 4 side and a connecting opening side of the exhaust blower 6, and provided with a plurality of slit-like outlets 8a whose major axis direction is y-axis direction. Accordingly, when the exhaust blower 6 is driven, the gas emitted downward from the slit nozzles 4 is rapidly recovered through the slit-like outlets 8a of the table 8 to the exhaust blower 6 side. Accordingly, foreign matters in the chamber 13 are hindered from floating.

Next, a process in which an alignment film is formed with such a drying apparatus in a manufacturing process of a liquid crystal display will be explained.

The process for manufacturing a liquid crystal display includes processes such as forming an alignment film, rubbing, printing a sealing material, spraying spacers, putting two substrates together, burning the sealing material, filling a liquid crystal, sealing a liquid crystal filling opening, and laminating a polarizing plate. Here, the alignment film forming process with the drying apparatus shown in FIG. 1 will be mainly explained.

When a cleaned glass substrate on one surface (hereinafter referred to as an electrode surface) on which six display areas (a display zone diagonal: 17 inch) consisting TFTs or color filter pixels are disposed is transferred to the process for forming an alignment film, as shown in the following, a coating of alignment film material on the glass substrate 1 is subjected to a drying process. A solution of substantially 5% by weight of the alignment film material that is obtained by dissolving soluble polyimide or polyamic acid in 1-methyl-2 pyrrolidone (NMP) or gamma-butyrolactone (BL) is used.

First, the air supply blower 5 is started to rotate, and thereby a gas is sent to the heater 2 that is being heated. Thereby, the heated gas, after once accumulated in the soaking vessel 7, is emitted from the tip end of each of the slit nozzles 4 at a uniform temperature (for instance, substantially 60 degree centigrade).

For the meanwhile, on the electrode surface of the cleaned glass substrate (720 mm×930 mm×0.7 mm), the solution of alignment film material is coated, by use of flexographic printing, in a thickness of substantial 1.5 $\mu$m. Thereby, the coating of alignment film material is formed. Then, when a temperature inside of the chamber 13 is stabilized at an appropriate temperature (for instance, substantial 55 degree centigrade), a shutter of a carry-in entrance of the chamber 13 is opened. The glass substrate 1 is disposed on the tip ends of the transfer arm 11 with the coating of alignment film material directed upward and transferred up to above the base plate 9 in the chamber 13.

Thereafter, the transfer arm 11 is moved in a z-axis direction so that the tip end of the transfer arm 11 may be accommodated between the rows of pins on the base plate 9. When thereby the substrate 1 is transferred from the tip ends of the transfer arm 11 onto tip ends of a group of pins, the transfer arm 11 is moved in an x-axis direction, and thereby the tip ends of the transfer arm 11 is pulled out between the rows of pins. Then, the shutter of the carry-in entrance of the chamber 13 is closed.

Thereafter, the motor 10 is started to rotate, and thereby the base plate 9 is made to reciprocate in an x-axis direction with an appropriate speed (for instance, substantially 100 mm/s). A stroke of the base plate 9 at that time is substantially the same distance with a disposition interval of the slit nozzles 4. Thereby, the solvent can be uniformly and efficiently vaporized from the entirety of the coating of alignment film material. Accordingly, in the stage before the burning, the variation in a film thickness and film characteristics of the coating of alignment film material can be prevented.

When at this time the hot air is sent out of the slit nozzles 4 so that a wind speed of the hot air in the neighborhood of the surface of the glass substrate 1 may be 0.5 m/s or more, the gas including the vaporized solvent, without lingering in the neighborhood of the surface of the glass substrate 1, can be smoothly emitted outside of the system. As a result, a drying time can be shortened.

Thus, when the solvent that is contained in the coating of alignment film material is vaporized by substantially 80% and thereby the coating of alignment film material has lost its fluidity, the transfer arm 11 is moved in an x-axis direction so that the tip end of the transfer arm 11 may be inserted in the clearance A between the glass substrate 1 and the base plate 9, and furthermore the transfer arm 11 is moved in a z-axis direction so that the glass substrate 1 may be transferred from on the tip ends of the pins 3 onto the tip end of the transfer arm 11. Thereby, the glass substrate 1 can be smoothly scooped up from the tip ends of the pins.

Thus, the glass substrate 1 can be scooped up from the tip ends of the pins without inflicting excessive force on the glass substrate 1. This is because each of the pins 3 that is small in the contact area with the glass substrate 1, different from the plate of the hot plate, hardly generates static electricity (electrification due to peeling) between the glass substrate 1. Accordingly, the glass substrate 1 can be hindered from generating defects such as a crack.

When the substrate 1 is scooped up from the tip ends of the base plate 9, until the drying is started to a coating of alignment film material of a next glass substrate 1, it is preferable that the air from the air supply blower 5 is stopped, and thereby the pins 3 are hindered from being heated.

When the above drying is completed, the glass substrate 1, as it is, is transferred, with the transfer arm 11, from a drying furnace to an infrared heating furnace. Then, the coating of alignment film material on the glass substrate 1 is cured. That is, the glass substrate 1 is heated at an appropriate temperature (for instance, substantially 230 degree centigrade) for an appropriate time period (for instance, substantially 20 min) in the infrared furnace, thereby the coating of alignment film material on the glass substrate 1 is cured. Thereby, an alignment film having a uniform film thickness and film characteristics can be formed on the glass substrate 1.

Thereafter, the glass substrate 1 is transferred from the process for forming the alignment film to the processes for, in turn, rubbing, printing a sealing material, spraying spacers, putting two substrates together, curing the sealing material, filling a liquid crystal, sealing a liquid crystal filling carry-in entrance, and laminating a polarizing plate. Thereby, a liquid crystal display including the glass substrate 1 is completed.

According to the above manufacturing process of a liquid crystal display, since in the process of forming the alignment film, the alignment film having uniform film characteristics can be formed with a uniform film thickness, a liquid crystal display may be hindered from generating irregularity in the liquid crystal molecule alignment. As a result, a liquid crystal display having excellent display characteristics can be obtained. Furthermore, since the substrate cracking that tends to occur in the process of forming the alignment film with the hot plate can be hindered from occurring, product yield in the manufacturing process of the liquid crystal displays can be also improved. Still furthermore, since there is no need of the process for thrusting up the substrate with the thrust pins, in comparison with the case where the hot plate is used, the manufacturing process can be made more efficient.

Figure 10:
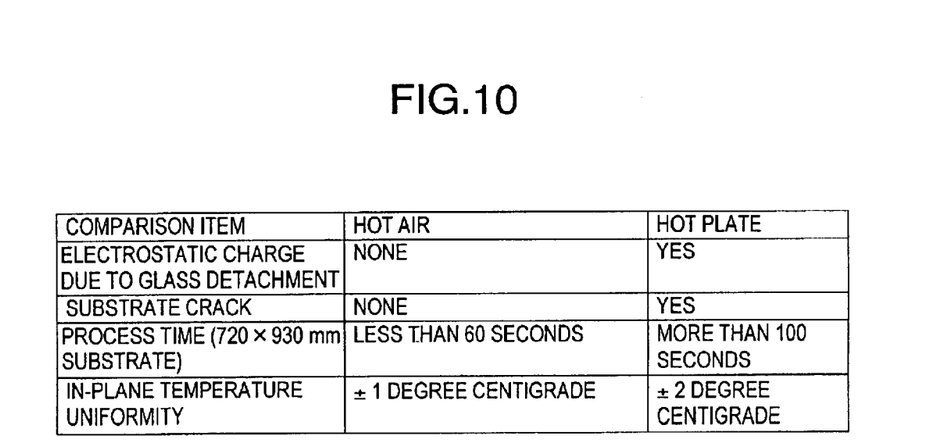
FIG. 10 is a diagram showing comparison between effects of drying with the hot plate and drying with the drying apparatus shown in FIG. 1.

These advantageous effects are summarized in FIG. 10 in comparison with the process performed with the hot plate.

(1) When the drying apparatus according to the present embodiment is used, there is observed no electrostatic charge due to peeling that occurs when the hot plate is used. Accordingly, different from the case where the hot plate is used, the glass substrate is hardly cracked.

(2) When the hot plate is used, in order to hinder the glass substrate from being cracked, the glass substrate has to be slowly lifted up with the thrust pins, which makes process time longer. On the other hand, when the drying apparatus according to the present embodiment is used, there is no need of the thrusting.

Accordingly, the efficiency in the process for forming the alignment film can be improved. For instance, while according to the hot plate, it takes 100 seconds or more to dry (from transferring in to transferring out) a 720 mm×930 mm glass substrate, according to the drying apparatus according to the present embodiment, a time period necessary to dry a 720 mm×930 mm glass substrate can be shortened to 60 seconds or less.

(3) When the hot plate is used, there is a fluctuation in the temperature of the glass substrate in the range of substantially ±2 degree centigrade. On the other hand, when the drying apparatus according to the present embodiment is used, the fluctuation in the temperature of the glass substrate can be suppressed to substantially ±1 degree centigrade. Accordingly, the coating of alignment film material can be dried uniformly. This advantageous effect has been confirmed through the following experiment.

The following experiment was carried out with the drying apparatus that had the pins 3 made of Bespel (registered trade mark) having thermal diffusivity of substantially 0.1 mm$^2$/s and the slit nozzles 4 arranged with a 200 mm interval. In the chamber whose inside temperature was stabilized at substantially 55 degree centigrade, while blowing a hot air of substantially 60 degree centigrade at a wind speed in the range of 0.5 to 2 m/s from each of the slit nozzles 4, at a position substantially 200 mm apart from the tip ends of the slit nozzles 4, the glass substrate 1 where the solution of alignment film material has been coated was reciprocated at a speed of 100 mm/s. The stroke of the glass substrate 1 at this time was 200 mm.

Figure 4:
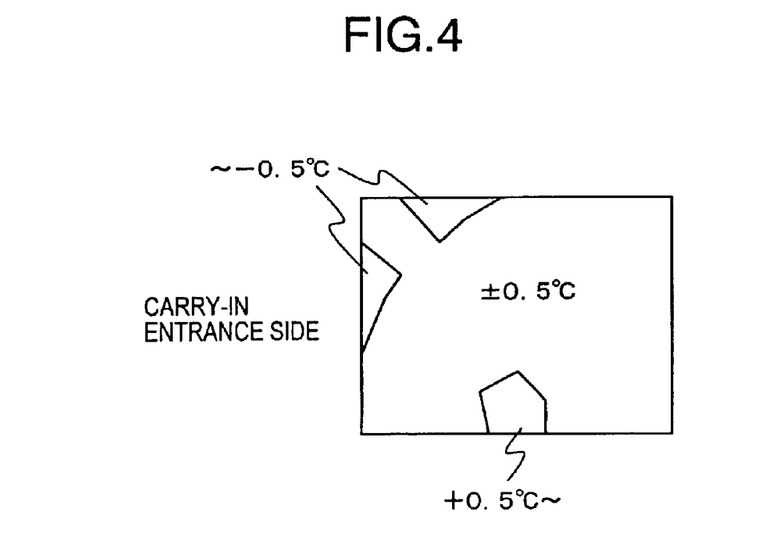
FIG. 4 is a diagram showing an in-plane temperature distribution of the glass substrate that is dried by use of the drying apparatus shown in FIG. 1.

As a result, since the preliminary drying of the coating of alignment film material was complete at substantially 25 seconds after the glass substrate 1 was charged into the chamber 13, the hot air was stopped blowing and the glass substrate 1 was stopped reciprocating at substantially 40 seconds after the glass substrate 1 was charged into the chamber 13, and appearance of the glass substrate 1 and the in-plane temperature distribution were observed. As a result, it was confirmed that there was no defect such as a crack in the glass substrate 1. Furthermore, it was also confirmed that the fluctuation of the temperature of the glass substrate 1 was suppressed to substantially ±1.0 degree centigrade. However, as shown in FIG. 4, it was found that with the exception of part of the glass substrate 1, the fluctuation of the glass substrate 1 was suppressed to substantially ±0.5 degree centigrade. That is, it was confirmed that the irregularity of the temperature in the glass substrate 1, which was a cause of the irregularity of the drying of the alignment material film, can be suppressed from occurring.

Thereafter, the glass substrate 1 was heated with the infrared furnace at a temperature of substantially 230 degree centigrade for 20 minutes, and thereby the alignment film material on the glass substrate 1 was cured. An LCD panel was manufactured with the glass substrate 1 where the alignment film was thus formed, and the pre-tilt angle thereof was measured. As a result, it was confirmed that the measured pre-tilt angle was substantially the same (substantially 6 degree) as that of the LCD panel in which the glass substrate whose alignment film was formed by use of the hot plate was used.

Next, the optimum drying conditions when the drying apparatus according to the present embodiment is used will be explained. In order to obtain the optimum conditions of the drying process, the following experiments were conducted.

(1) Embodiment 1

Figure 5A:
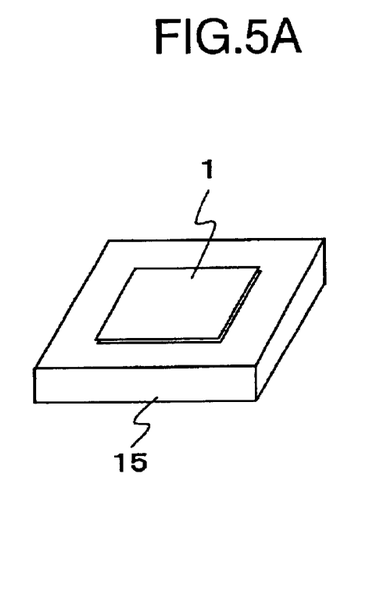
FIG. 5A is a schematic diagram showing experimental facilities for optimizing a drying process.
Figure 5B:
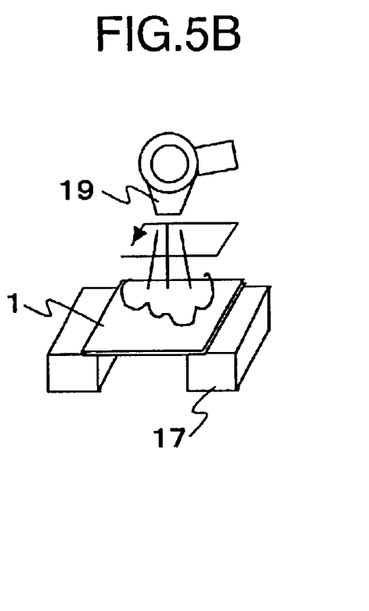
FIG. 5B is a schematic diagram showing experimental facilities for optimizing a drying process.

In order to optimize the drying time, as shown in FIG. 5A and FIG. 5B, by heat conduction from the hot plate 15 and the hot air from a dryer 19, respectively, the alignment film material films on the glass substrates 1 having a size of 100 mm×100 mm×1.1 mm were dried. The dryer 19 was held so that the hot air might be vertically blown onto the glass substrate 1, and allowed to reciprocate level in this state.

For the alignment film material used here, one that was made of a main chain having polyimide skeleton and side chains made of long chain alkyl group, and develops the pre-tilt angle owing to the long chain alkyl group present on an alignment film surface, was used. The solvent used to dilute the alignment film material was 1-methyl-2-pyrrolidone (NMP), gamma-butyrolactone (BL).

Figure 6:
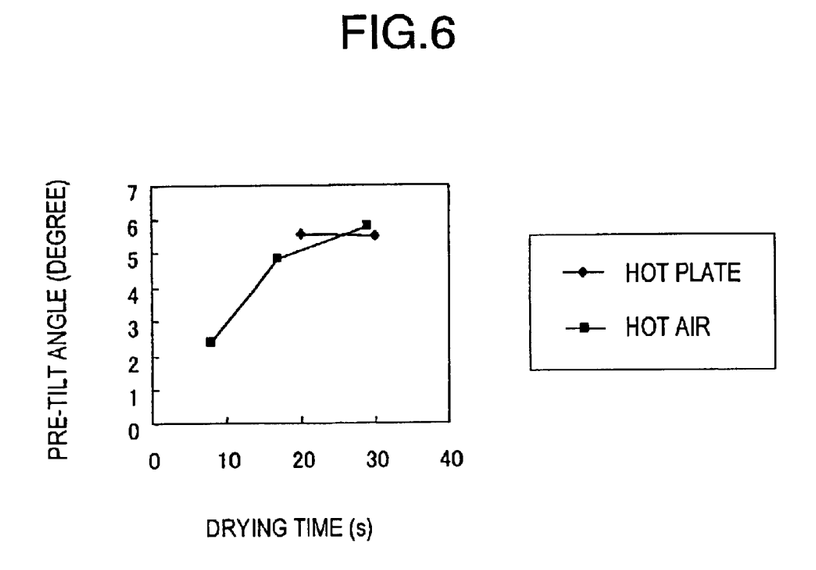
FIG. 6 is a diagram showing relationship between drying time and pre-tilt angle for each drying method.

After the solvent was dried, under the same conditions liquid crystal cells were prepared and the pre-tilt angles thereof were measured. The results were as shown in FIG. 6. The drying time was defined as follows. When the solution coated on the substrate is being dried and the solvent is being vaporized, the film thickness decreases and an interference fringe appears in the film plane. When the vaporization of the solvent is complete and the film thickness becomes uniform, the interference fringe disappears and the film plane exhibits a uniform interference color. A time period from the start of the heating of the substrate to the appearance of uniform interference color was measured as the drying time.

When the hot plate was used to dry, the pre-tilt angle exhibited substantially the same value irrespective of the drying time. On the other hand, when the hot air drying was used, the pre-tilt angle largely depends on the drying time, and the pre-tilt angle was smaller when the drying time was shorter.

Figure 7:
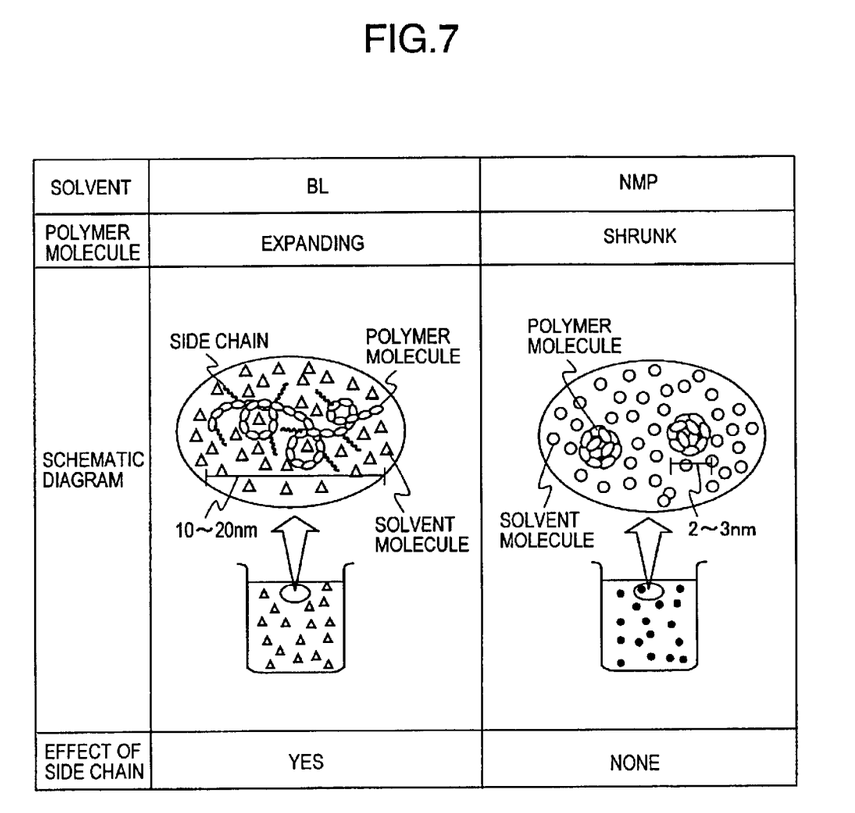
FIG. 7 is a diagram conceptually showing a polymer molecule size in a solution of alignment film.

An influence that the solvent composition gave on alignment film polymer molecule was studied. The alignment film polymer molecule was dissolved in NMP and BL, respectively, and the molecular sizes were obtained from static light scattering measurement. Results are shown in FIG. 7. It was found that the polymer molecule shrunk in the NMP solution. It was considered that when the polymer molecule shrunk, the side chains that contributed in the development of the pre-tilt angle were rounded in the main chain. Furthermore, it was found that the pre-tilt angle became smaller in the alignment film that was formed with a solution whose NMP ratio was high. It was considered that while when the alignment film polymer molecule became expanding, the side chains that were high in affinity with air prevail in the film surface, when the alignment film polymer molecule was contracted, the side chains that contribute in the pre-tilt angle were rounded in the main chain and an amount of the side chains that were present in the film surface decreases, resulting in a decrease in the pre-tilt angle.

When the solvent was dried, each component of mixed solvent did not vaporize at the same time, BL vaporizing more rapidly than NMP. Accordingly, in the coating, at the same time with concentration of the alignment film polymer molecule, a composition of the solvent carrier changes. It was considered that a solvent composition in the coating changed at the drying process in the following way.

By heating, BL vaporized from the surface of the alignment film. In the film, since a concentration gradient of the solvent developed in a depth direction, BL diffused from the substrate side to the surface side. However, when the drying time was short, the diffusion in the film could not cope with the vaporization from the surface, resulting, in the surface, in an increase in a compositional ratio of NMP that was difficult to vaporize. In addition, in the hot air drying, in order to suppress the solvent from lingering, the solvent vapor was actively removed by the gas exhaust, resulting in an increase in vaporization speed difference between BL and NMP. As a result, the concentration of NMP in the surface was forwarded. Accordingly, under the high speed drying condition in which NMP tended to be concentrated, the polymer molecule in the surface shrank and the pre-tilt angle decreased.

From the above results, a temperature and wind speed that made the drying time 20 seconds or more at that the pre-tilt angle becomes the same or better than that of the existing hot plate drying were set as the optimum hot air drying conditions of the alignment film material. It was found that the optimum temperature at the outlet of the hot air was in the range of from 70 to 90 degree centigrade, and the optimum wind speed above the substrate was in the range of from 1.5 to 2.0 m/s.

(2) Embodiment 2

Figure 8:
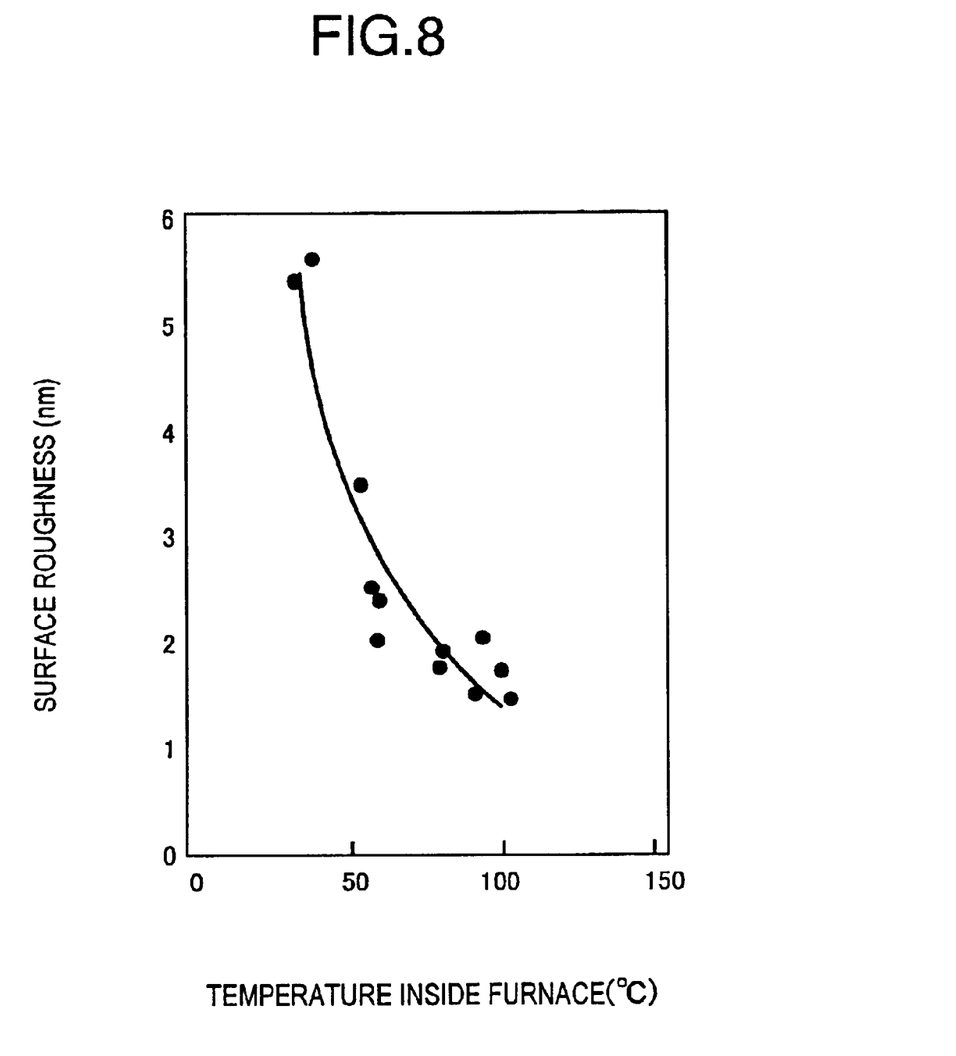
FIG. 8 is a diagram showing relationship between temperature in a chamber of the drying apparatus shown in FIG. 1 and surface roughness of the coating after preliminary drying.

With the drying apparatus according to the present embodiment, the gases of various temperatures were blown on the glass substrates, and appearance of the coatings of alignment film materials were observed. As a result, it was found that when the gas was blown at a temperature equal to 30 degree centigrade or less, the flatness of the coating of alignment film material was deteriorated. Furthermore, it was found that when the gas was blown at a temperature equal to 30 degree centigrade or more, the flatness of the coating of alignment film material, as shown in FIG. 8, changed depending on the gas temperature. That is, it was found that as the gas temperature was higher, since the fluidity of the solution of alignment film material was improved, the flatness was improved.

Since the solvent of the alignment film solution is generally a mixture of solvents, at the drying, a composition ratio of the solvents changes. At this time, with the time, the affinity of the solvent with the alignment film polymer molecule changes and the fluidity is caused to decrease owing to an increase in the alignment film concentration. As a result, the structure of the alignment film polymer molecule at the upper most surface is determined. For instance, a solvent that is a little inferior in the affinity with the alignment film is concentrated, the molecule is contracted, as a result, the surface concentration of the polymer molecule side chains that develop the pre-tilt angle decreases, resulting in a decrease in the pre-tilt angle.

Figure 9:
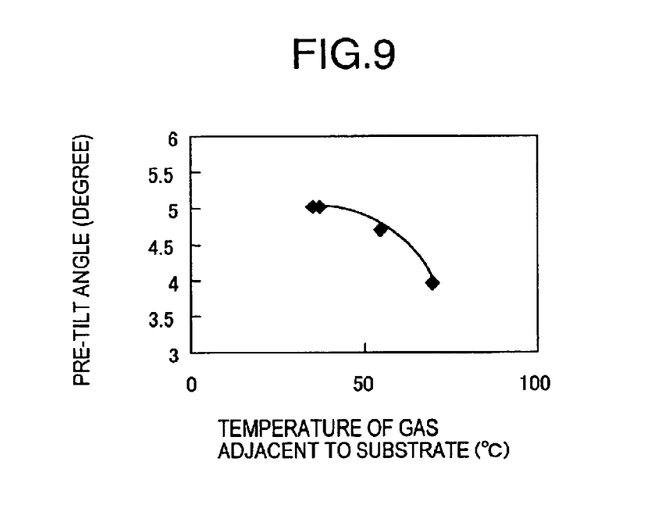
FIG. 9 is a diagram showing relationship between temperature of hot air and pre-tilt angle.

With the glass substrates that had undergone the drying process due to the gases of various temperatures, the cells were prepared, respectively, and the pre-tilt angles thereof were measured. As a result, as shown in FIG. 9, it was confirmed that as the gas temperature became higher, the pre-tilt angle became lower. It was also confirmed that when the gas at 100 degree centigrade or more was used to dry, an appropriate pre-tilt angle was difficult to obtain.

From the above results, in the present embodiment, as the optimum temperature range of the feed gas from the nozzle, substantial 30 to 100 degree centigrade was adopted.

Figure 11:
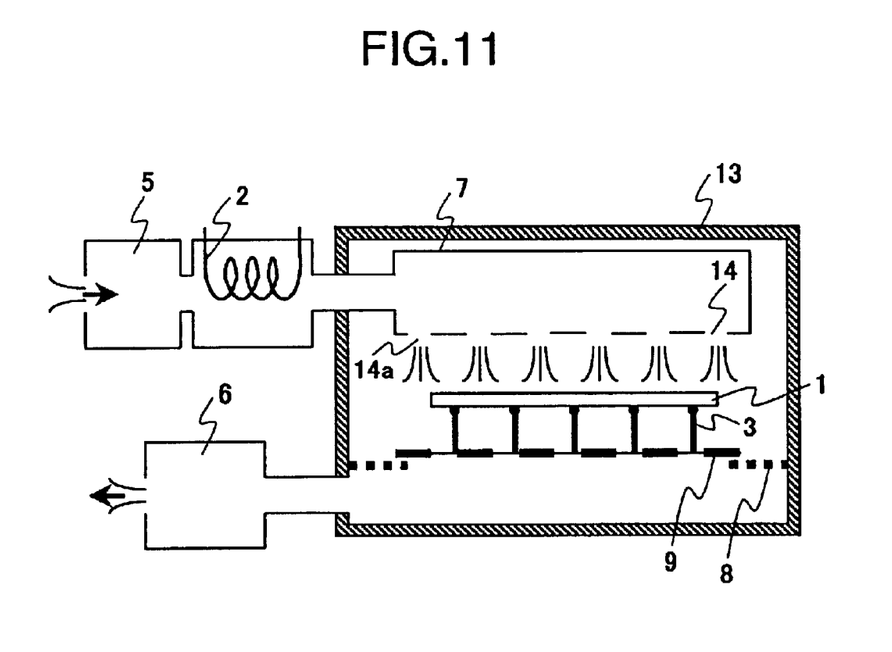
FIG. 11 is a schematic block diagram of drying apparatus according to one embodiment of the present invention.

In the present embodiment, in order to discharge the gas from the soaking vessel 7, the nozzles 4 are used. However, it is not necessarily restricted to the nozzle. For instance, as shown in FIG. 11, a plate material 14 in which a plurality of through holes 14a is formed in matrix, in place of the slit nozzles 4, may be attached to the soaking vessel 7.

In such a configuration, when the plate material 14 in which the through holes 14a having a diameter of substantially 5 mm are formed with 20 mm separated from each other is used, the gas can be uniformly blown onto the whole substrate 1. Accordingly, necessity of reciprocating the substrate 1 in an x-axis direction becomes smaller. When the substrate 1 is made not to move, the driver unit may be omitted in the configuration except for the table 8, and entrainment of the foreign matters in the coating of alignment film material may be hindered from occurring.

Figure 12:
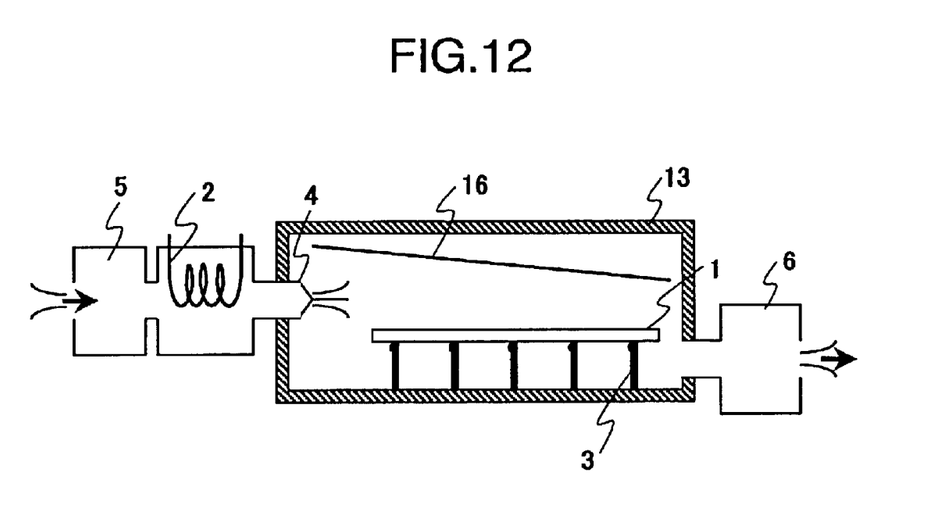
FIG. 12 is a schematic block diagram of drying apparatus according to one embodiment of the present invention.

Still furthermore, in the present embodiment, the gas is supplied from a front side of the substrate 1. It is not necessarily performed in this way. For instance, the gas may be supplied from one end face side of the substrate 1. In order to perform in this way, as shown in FIG. 12, one slit nozzle 4 need only be disposed at one end surface side of the substrate 1 so that a nozzle opening may be substantially parallel with the substrate 1. In this case, since only one slit nozzle 4 is necessary, there is no need of the soaking vessel 7. As a result, the drying apparatus can be made smaller in its size.

However, in this case, the gas from the slit nozzle 4, because the gas is deprived of energy corresponding to latent heat of vaporization of the solvent and so on, becomes gradually lower in its temperature as the gas flows on along both surfaces of the substrate 1. In order to reduce the drying irregularity due to this in the coating of alignment film material, it is desirable to dispose, in the chamber 13, a top plate 16 whose interval from the substrate 1 becomes gradually narrower as goes further from the slit nozzle 4.

Thereby, since the flow rate of the gas from the slit nozzle 4 becomes gradually faster as the gas flows along the substrate 1, the in-plane irregularity of the drying speed of the coating of alignment film material can be suppressed, resulting in obtaining a decrease in the drying irregularity of the coating of alignment film material.

In the present embodiment, although the glass substrate is lifted up from the base plate by means of the pins, the glass substrate may be lifted up from the base plate by means of the supporting member other than the pins. For instance, projections that come into line contact with the glass substrate may be formed on the base plate.

Furthermore, in the present embodiment, although the base plate is moved with respect to the gas feeder (nozzle), the gas feeder (nozzle) may be moved with respect to the base plate, or both may be moved.

According to the present invention, liquid crystal displays having excellent display characteristics can be obtained.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A method for manufacturing a liquid crystal display including a first substrate and a second substrate that faces the first substrate, comprising:
   a first process for coating with a solution for use in the formation of an alignment film on a first surface of the first substrate which faces the second substrate; and
   a second process for generating a flow of gas on the first surface side which is coated with the solution, that vaporizes a solvent contained in a coating layer of the solution on the first surface side,
   wherein in the second process, a nozzle and the first substrate are relatively moved while heated gas is supplied from the nozzle on the first surface side of the first substrate, which is coated with said solution.

2. The method for manufacturing a liquid crystal display as set forth in claim 1:
   wherein said second process is performed in a state where a space is formed on a second surface side that is opposite to the first surface of the first substrate which is coated with the solution.

3. The method for manufacturing a liquid crystal display as set forth in claim 1:
   wherein the first substrate is supported by supporting members at a plurality of positions on a second surface that is opposite to the first surface which is coated with the solution, at least each of tip end portions of said supporting members being made of a material having a thermal diffusivity equal to or less than 0.5 mm$^2$/s.

4. The method for manufacturing a liquid crystal display as set forth in claim 1, wherein the flow of gas is generated so as to have a speed of at least 0.5 m/s at the first surface of the first substrate.

5. The method for manufacturing a liquid crystal display as set forth in claim 1, wherein the gas flow on the first surface side has a flow velocity at the substrate in a range of 1.5 to 2.0 m/s, and has a temperature, at an outlet of structure generating the flow of gas, in a range of 70° C–90° C.

6. The method for manufacturing a liquid crystal display as set forth in claim 1, wherein the gas flow has a temperature, at an outlet of structure generating the flow of gas, in a range of 30° C–100° C.

7. Drying apparatus for drying a solution that is coated on a first surface of a substrate and used in the formation of an alignment film, comprising:
   a heater for heating a gas, a nozzle for supplying said gas on the first surface side of the substrate which is coated with said solution so as to vaporize a solvent contained in a coating layer of said solution, and a driving mechanism for moving said nozzle and said substrate relatively.

8. Drying apparatus as set forth in claim 7, wherein the nozzle is adapted to be positioned at one end side face of the substrate, and wherein the drying apparatus further includes a top plate whose interval from the substrate decreases as the distance from the nozzle increases.

9. Drying apparatus as set forth in claim 7, wherein said substrate is supported by supporting members at a plurality of positions so as to form a space adjacent a second surface of the substrate that is opposite to said first surface which is coated with said solution, at least each of the tip end portions of said supporting members being made of a material having a thermal diffusivity equal to or less than 0.5 mm$^2$/s.

10. Drying apparatus as set forth in claim 9, wherein the tip ends of the tip end portions of said supporting members have a curvature radius equal to or less than 5 mm.

11. Drying apparatus as set forth in claim 7, wherein said substrate is supported by supporting members at a plurality of positions adjacent a second surface of the substrate that is opposite the first surface which is coated with said solution, with tip ends of tip end portions of said supporting members having a curvature radius of 5 mm.

12. A method for manufacturing a liquid crystal display including a first substrate and a second substrate that faces the first substrate, comprising:

a first process for coating with a solution for use in the formation of an alignment film surfaces of the first and second substrates that face each other in the liquid crystal display; and a second process for generating a flow of gas on surface sides of the first and second substrates which are coated with the solution, that vaporizes a solvent contained in a coating layer of the solution on each of said surfaces of the first and second substrates that face each other in the liquid crystal display, wherein in the second process, a nozzle and the first substrate are relatively moved while heated gas is supplied from the nozzle on the first surface side of the first substrate, which is coated with said solution.

13. A method for manufacturing a liquid crystal display including a first substrate and a second substrate that faces the first substrate, comprising:

a first process for coating a second substrate side of the first substrate with a solution for use in the formation of an alignment film on the second substrate side of the first substrate; and a second process for generating a flow of gas on the surface side of said first substrate which is coated with said solution, wherein, in said second process, a heated gas is supplied from a nozzle to the second substrate side of said first substrate which is coated with the solution, and a flow of gas toward the periphery of said substrate, on the surface coated with said solution, is generated by exhausting said gas from an exhaust outlet which is provided on the opposite side of said first substrate from the second substrate side of the first substrate.

14. Drying apparatus for drying a solution that is coated on a surface of a substrate and used in the formation of an alignment film, comprising:

a nozzle for supplying gas to the surface which is coated with said solution, a heater for heating said gas, and an exhaust outlet which is provided on the opposite side of the substrate to the side of the substrate at which the nozzle is positioned, so as to generate, on said surface which is coated with said solution, a flow of gas toward the periphery of said substrate.

\* \* \* \* \*